United States Patent [19]

Mommsen et al.

[11] Patent Number: 4,679,734
[45] Date of Patent: Jul. 14, 1987

[54] ROBOT SPRAY GUN

[75] Inventors: Gordon V. Mommsen, Brooklyn Center, Minn.; Norman N. Fender, Monroe, Mich.; Stanley G. Karwoski, St. Paul, Minn.; William C. Scherer, Minneapolis, Minn.; Robert J. Lind, Robbinsdale, Minn.

[73] Assignee: Graco Inc., Minneapolis, Minn.

[21] Appl. No.: 792,907

[22] Filed: Oct. 30, 1985

[51] Int. Cl.⁴ .................. B05B 5/02; B05B 15/08
[52] U.S. Cl. .................. 239/692; 239/694; 239/704; 239/587; 901/25; 901/29; 901/43
[58] Field of Search .............. 239/690, 708, 692, 694, 239/704, 587; 901/43, 41, 25, 28, 29

[56] References Cited

U.S. PATENT DOCUMENTS

| | | | |
|---|---|---|---|
| 935,458 | 9/1909 | Bruckner | 239/587 X |
| 1,150,461 | 8/1915 | Schurs | 239/587 X |
| 2,809,902 | 10/1957 | Ransburg | 117/93 |
| 3,155,539 | 11/1964 | Juvinall | 118/11 |
| 3,219,276 | 11/1965 | Norris | 239/186 |
| 4,125,035 | 11/1978 | Dooley | 74/480 |
| 4,151,808 | 5/1979 | Beck et al. | 118/2 |
| 4,239,431 | 12/1980 | Davini | 414/1 |
| 4,455,965 | 6/1984 | Jung et al. | 118/622 |
| 4,462,061 | 7/1984 | Mommsen | 361/227 |
| 4,497,447 | 2/1985 | Mommsen et al. | 239/691 |
| 4,561,592 | 12/1985 | Fender et al. | 239/587 |

Primary Examiner—Andres Kashnikow
Assistant Examiner—Mary Beth O. Jones
Attorney, Agent, or Firm—Douglas B. Farrow

[57] ABSTRACT

A spray gun is designed for mounting on the end of a robot arm. The construction of the gun is provided such that nearly all of the main components with the exception of the spray head itself are located in a main body to which is mounted a pivotal spray head assembly which may pivot approximately 90° to either side of the normal straight-ahead position. The power supply and power generating units are located in the main body. The electrostatic power supply connection to the spray head enters the spray head shaft on the opposite side from the fluid supply entry. The fluid control valve may be located in the spray head shaft.

5 Claims, 6 Drawing Figures

ROBOT SPRAY GUN

BACKGROUND OF THE INVENTION

Recently, the use of robots has been increasing rapidly in industry. In particular, the use of robots for spray painting and other finishing operations has provided a substantial opportunity for increased efficiency. Traditionally, standard spray guns or modified versions of standard guns have been utilized merely by mounting those on the end of a robot arm. Such modifications generally consist of removing the piston grip which is present on most spray guns; however, other than such removal, there is no other substantial adaptation made to the gun suiting it to use of a robot. In order to reach into tight corners, often times the gun is mounted on an actuator which reorients the spray gun plus or minus 90° about its mounting point, thus allowing the arm and gun to reach into tight corners. Because the payload in general of robot arms is fairly limited and because the spray guns often weigh substantial amounts, the flipper mechanism can be highly stressed. It is therefore desired to provide a spray gun which pivots only the necessary portions rather than the whole gun.

In general, electrostatic spray guns are well known. Traditionally, such guns have needed a high voltage cable running from a power supply to the gun. More recent guns utilize a built-in power generation assembly which uses compressed air to operate a small turbine-alternator unit to provide a voltage source which is then multiplied to a value useful for electrostatic paint applications. Such constructions are shown and described in U.S. Pat. Nos. 4,462,061, and 4,497,447. Such devices are also manufactured by the assignee of the instant application under the model name PRO-4000.

SUMMARY OF THE INVENTION

The instant invention is designed to provide a pivotable spray head assembly which is attached to a main body housing. The spray head assembly is mounted on a pivoting shaft which in turn pivots in the main body housing. Mounted in the pivoting shaft is the fluid valve which is air actuated. The power supply is mounted in the main body housing, and has a rotatable contact connection at the end of the shaft opposite the fluid connection and the valve. The turbine-alternator assembly, along with its associated multiplier and control circuitry, is also located in the main housing. In short, almost all of the mechanisms of the spray gun, which have any substantial weight and inertia at all, are located in the main portion of the gun with only literally the spray nozzle located at the end of the pivotal spray head assembly. This enables the pivoting mechanism to be light in weight and responsive in nature. This pivoting head also allows the spray gun to get into tighter areas and can serve to simplify the programming of the robot, while at the same time increasing the flexibility and versatility of the robot.

The positioning mechanism utilizes two pistons which may be energized in various directions and combinations to provide three different spray head positions. Energizing the main piston in a first direction results in a first extreme travel, while energizing in the other direction results in the opposite extreme of travel. Energizing the stop piston provides a stop for the sector gear operated by the main piston such that, when the main piston is energized in the first direction and the stop piston is actuated, the nozzle is pointed in the straight-ahead position.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

FIG. 1 has a perspective view of a sprayfinishing robot showing the instant invention mounted on the end thereof.

FIG. 4 is a simplified view showing the positioning mechanism of the instant invention in the straight-ahead position.

FIG. 5 is a view similar to FIG. 4 showing the spray head in one extreme.

FIG. 6 is a view similar to FIG. 4 showing the spray head in the opposite extreme.

DESCRIPTION OF THE PREFERRED EMBODIMENT

Figure 1:
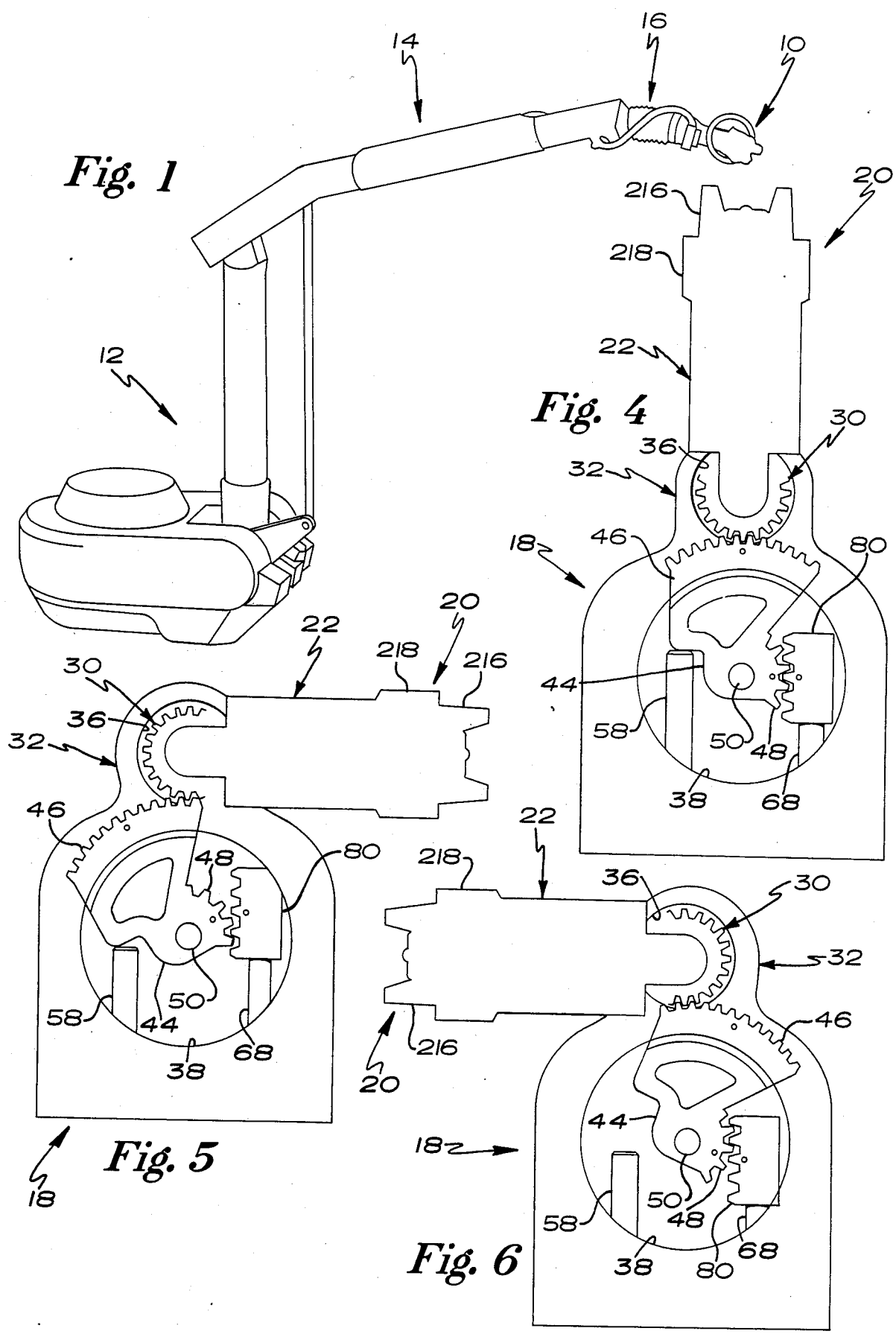
Figure 2:
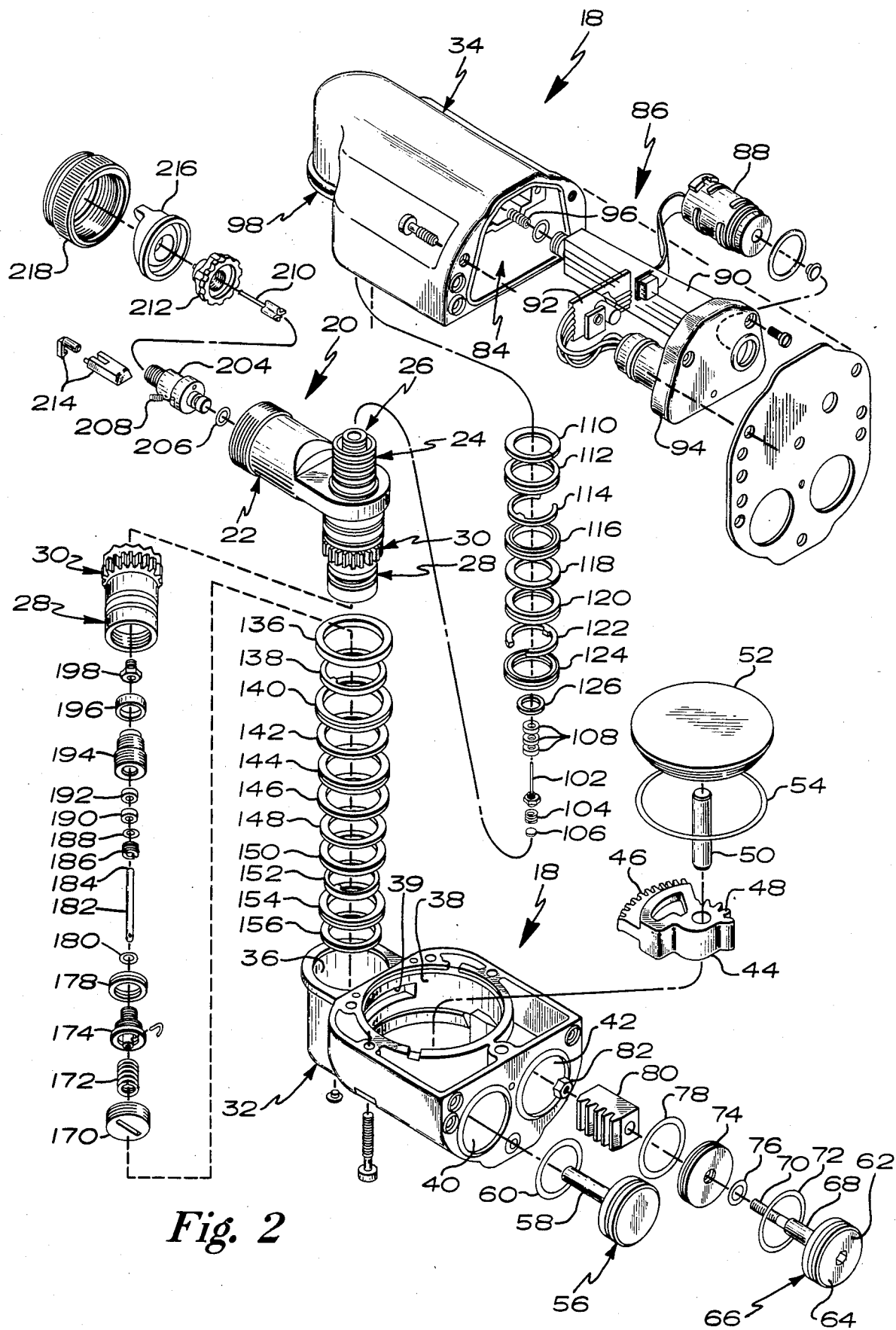
FIG. 2 is an exploded perspective view showing the spray gun of the instant invention.

The spray gun 10 of the instant invention is shown schematically in FIG. 1 mounted to robot 12. Robot 12 is provided with an arm 14 and a wrist 16 at the end thereof to which is mounted spray gun 10. As shown in FIG. 2, gun 10 has two basic assemblies, the first being the body 18 and the second being the rotating head assembly 20. Head assembly 20 is formed of a spray head 22 which is attached approximately at the midpoint of a shaft 24 between first end 26 and second end 28. A gear 30 is mounted adjacent second end 28 of shaft 24. Spray head 22 is desirably molded out of a plastic material, such being generally light in weight and resistant to the corrosive action of various fluids.

The main housing body 18 is formed from first and second body portions 32 and 34, respectively. Body portions 32 and 34 are desirably also formed of a molded plastic material which is light, nonconductive and corrosion resistant. As can be seen generally in FIG. 2, first body portion 32 contains the positioning mechanism while second body portion 34 contains the electrostatic power supply. First body portion 32 is provided with a shaft bore 36 for receiving the second end 28 of spray head shaft 24. Located adjacent to and parallel to shaft bore 36 is gear chamber 38. A stop piston bore 40 and a main piston bore 42 are located parallel to one another and perpendicular to the axis of gear chamber 38. Both piston bores 40 and 42 connect with the interior of gear chamber 38. Gear chamber 38 also connects with shaft bore 36, as will be discussed hereinafter.

Located in gear chamber 38 is a sector gear 44 having shaft teeth 46 on one side and piston teeth 48 on another. Sector gear 44 is rotatably mounted on shaft 50 which is in turn secured at the bottom of gear chamber 38. A gear chamber cover 52 is utilized to seal and isolate gear chamber 38 from the rest of the device, which sealing assisted by means of O-ring 54. Shaft teeth 46 engage gear 30 on shaft 24 of spray head 22 through an opening 39 that can be seen in FIG. 3.

A stop piston 56 is located in stop piston bore 40 and has a stop shaft 58 on the end thereof, while a seal 60 is secured about the periphery of piston 56.

Similarly, main piston 62 has a first face 64 and a second face 66, along with a shaft 68 and a threaded end portion 70. O-ring seal 72 is used to seal about the periphery of piston 62. A sealing piston 74 allows shaft 68 to slide therethrough and has an interior O-ring seal 76 and an exterior O-ring seal 78. A gear section 80 is located on the end of shaft 68 and is secured thereto with a nut 82 which is threadably engaged with threaded portion 70. Sealing piston 74 seats and seals against the interior end of main piston bore 42 and allows piston 62 and shaft 68 to move inwardly and outwardly with the bore, thereby allowing gear section 80 to move while, at the same time, isolating the second side 66 with piston 62 so that the chamber therein may be pressurized as will be described more fully hereinafter. Gear section 80 engages piston teeth 48, as can be seen generally in FIGS. 4 through 6. It can be appreciated that other positioning mechanisms may be utilized such as a rack and pinion arrangement.

A cavity 84, shown in FIG. 2, is located in a second body portion 34 for receiving, in general, the power supply for gun 10. Power supply 86 is comprised, in general, of a turbine-alternator set 88 similar to that used in the aforementioned Graco PRO-4000 gun, along with a multiplier 90 and associated circuit board 92. Those components are secured to a base plate 94 which is secured into the end of second body portion 34. A contact spring 96 is located in the end of multiplier 90. A second shaft bore 98 is located in housing portion 34 for receiving the first end 26 of shaft 24 on spray head 22. Best seen in FIG. 3, Spring 96 is in electrical communication with a connecting wire 102 located in a stud 100 which extends upwardly from the bottom of bore 98. As can be seen in FIG. 2, a second contact spring 104 insures contact between wire 102 and a contacting plate 106 which is, in turn, in electrical contact with wire 107 which leads outwardly through spray head 22, as will be more fully described hereinafter. Seals 108 are located about spindle 100 and serve to help provide sealing thereabouts.

Figure 3:
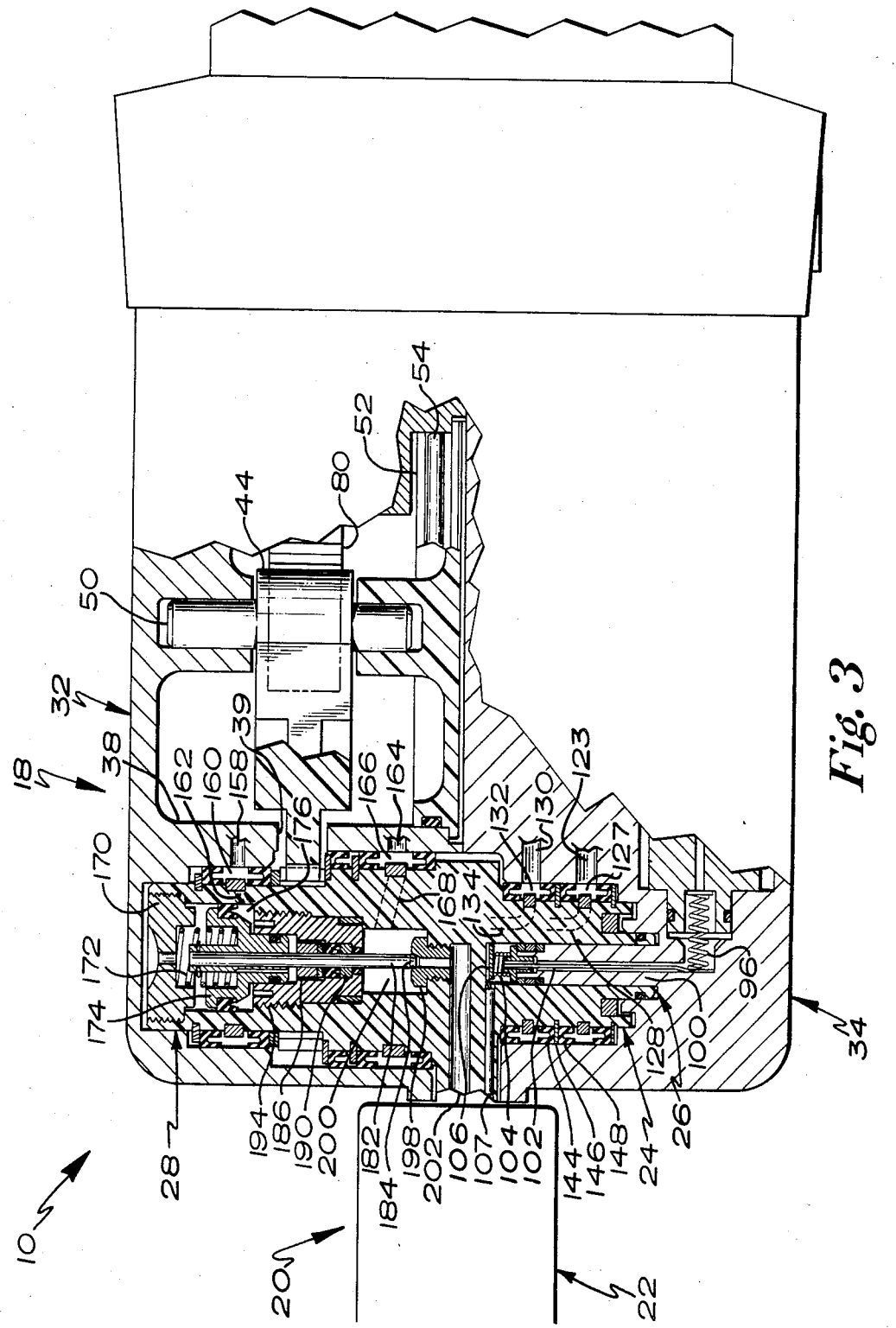
FIG. 3 is a partial cross-section of the assembled device shown in FIG. 2 rotated 180° about the horizontal center line.

As can be seen particularly in FIGS. 2 and 3, a fairly complex combination and arrangement of locating rings is utilized to separate and seal between the various chambers and passages. In particular, snap ring 110 is utilized to locate seal 112. A split snap ring 114 separates seal 112 from seal 116, while another snap ring 118 separates seals 116 and 120. Another split snap ring 122 separates seals 120 and 124.

In FIG. 3, a passage 123 for atomizing air is molded into body portion 34 and terminates into communication with an annular space 127 located between seal 112 and 116. The opening in split snap ring 114 is located to communicate with internal passage 128 which passes through spray head 20 for communication with the spray nozzle assembly. Similarly, a shaping air passage 130 passes through body portion 34 into communication with annular space 132 between seals 120 and 124. Similarly, the opening in split snap ring 132 is aligned with an interior shaping air passage 134 also located in spray head 20.

Similarly, on the second end 28 of shaft 24 is a further sealing arrangement this time dealing with the fluid section and the associated valve actuation as visible in FIG. 2. Seal 136 is located adjacent the base of end 28 and is located by a split snap ring 138 which also separates seal 136 from seal 140. Seal 140 is, in turn, also located by snap ring 142 and which is, in turn, backed up by a second seal 144 and another snap ring 146. Seal 144 is, in turn, located by a snap ring 146. A snap ring 148 holds seal 150 in place which is in turn separated from seal 154 by means of a split snap ring 152. Seal 154 is also further located by means of a snap ring 156. Shown in FIG. 3, a passage 158 also comes from the base of the gun and is molded into the interior of first body portion 32. Fluid actuation valve passage 158 serves to transport air when air is introduced to the passage to open the fluid valve as will be more fully described hereinafter.

Passage 158 connects with an annular space 160 between seals 150 and 154. Similarly, the opening of split snap ring 152 is aligned with an interior passage 162 which communicates with the interior of the valve assemblies will be more fully described hereinafter.

Similarly, a fluid passage 164 also is located in body portion 32 and conducts fluid into an annular space 166 located between seals 136 and 140. Again, a split snap ring 138 serves to separate seals 136 and 140 with the split being aligned with an interior passage 168 which communicates with the interior of shaft end 28.

Best seen in FIG. 2, a shaft plug 170 is screwed into the second end 28 of shaft 24 and serves to seal the valve assembly therein. A spring 172 serves to bias the valve into a closed position. A valve piston 174 has a seal 178 about the outside thereof, while a smaller seal 180 further serves to seal piston 174. Piston 174 is located on a shaft 182 having a sealing tip 184. Sealing numbers 186, 188, 190 and 192 are located about needle 182 and serve to seal it relative to plug member 194 which is also threadably engaged in shaft end 28. Another seal 196 helps seal plug 194 relative to shaft end 28. The valve seat 198 is located in the bottom of fluid chamber 200. A fluid passage 202 conducts fluid from the seat 198 to the fluid nozzle assembly.

From the point shown on FIG. 2 outwardly to the fluid spray head and nozzle portion 22, the construction is fairly conventional. In particular, a fluid stud 204 is engaged with spray head 22 and sealed by O-ring 206 from fluid passage and is located by one or more set screws 208. A contact point in the base of stud 204 contacts wire 107. A fluid nozzle 212 is threadably engaged over fluid stud 204 and is locked in place by locking mechanism 214, the details of which are shown in co-pending application Ser. No. 737,823, filed May 23, 1985, the contents of which are incorporated herein by reference. An air cap 216 fits over fluid nozzle 212 and is held in place by retaining ring 218.

In operation, the device is quite simple to understand. As can be seen in FIG. 3, atomizing and shaping air are supplied through passages 123 and 130, whereupon they are routed to the spray head 22 through further passages 128 and 134. When spraying is desired, air is supplied to passage 158 whereupon it passes through annular space 160 and passage 162 into air chamber 176, thereby pushing piston 174 and needle 182 away from valve seat 198. Fluid has been supplied through passage 164, annular 166 and passage 168 into fluid chamber 200, whereupon it is then allowed to flow through fluid passage 202 to the relatively conventional spray head 22. It is to be noted that these various fluid and air arrangements allow communication no matter what the positioning of the spray head mechanism so that continuous spraying may be maintained regardless of the angular orientation of the head 20.

Returning to FIG. 2, positioning the spray head 20 is accomplished quite simply. When it is desired to position the spray head 20 in the first position, as shown in FIG. 5, air is applied to the first face 64 of main piston 62 thereby causing main piston 62 and gear section 82 to move in the direction of spray head 20 and the tip of gun 10. That motion is transmitted through gear section 82, piston teeth 48, thereby rotating section gear 44 and shaft teeth 46 which in turn engage shaft gear 30 to rotate spray head 20 into the position shown in FIG. 5.

Similarly, to position spray head 20 in the position shown in FIG. 6, air is applied to the second face 66 of main piston 62 thereby causing piston 62 to move away from shaft 24, thereby positioning the spray head accordingly.

To place spray head 20 in straight-ahead, intermediate or third position, air is applied to the first face 64 of main piston 62 and air is also applied to stop piston 56, whereupon the shaft 58 thereof contacts sector gear 44 thereby stopping spray head 20 in the position shown in FIG. 4.

The power supply 86 operates in the same manner as that of the aforementioned Graco PRO-4000 spray guns. As the general operation of power supply 86 and the way in which the paint is electrostatically charged is well known, no detailed explanation is necessary other than that set forth herein.

It is contemplated that various changes and modifications may be made to the spray gun without departing from the spirit and scope of the invention as defined by the following claims.

What is claimed is:

1. A spray gun for mounting on a robot, said spray gun comprising:
   main housing comprising a fluid passage and a compressed air passage;
   a spray head pivotably mounted to said main housing, said spray head being pivotable between at least first and second positions, said spray head comprising:
      a shaft comprising first and second ends;
      a compressed air passage in said first end;
      a fluid passage in said second end; and
      a nozzle assembly attached to said shaft intermediate said ends, said shaft ends rotatably pivoting in said main housing;
   means for transferring fluid from said housing to said spray head through said shaft second end and comprising means sealing said main housing fluid passage and said spray head fluid passage in sliding communication with one another and in isolation from the atmosphere;
   means for transferring compressed air from said housing to said spray head through said shaft first end and comprising means sealing said main housing air passage and said spray head air passage in sliding communication with one another and in isolation from the atmosphere;
   an electrostatic power supply; and
   means for transferring electrostatic potential from said power supply to said spray head through said shaft first end.

2. A spray gun for mounting on a robot, said spray gun comprising:
   a main housing comprising a fluid passage and a compressed air passage;
   a spray head pivotably mounted to said main housing, said spray head being pivotable between at least first and second positions, said spray head comprising:
      a shaft comprising first and second ends;
      a compressed air passage in said first end;
      a fluid passage in said second end; and
      a nozzle assembly attached to said shaft intermediate said ends, said shaft ends rotatably pivoting in said main housing;
   means for transferring fluid from said housing to said spray head through said shaft second end and comprising means sealing said main housing fluid passage and said spray head fluid passage in sliding communication with one another and in isolation from the atmosphere;
   means for transferring compressed air from said housing to said spray head through said shaft first end and comprising means sealing said main housing air passage and said spray head air passage in sliding communication with one another and in isolation from the atmosphere; and
   valve means in said shaft second end for controlling fluid flow wherein said valve means is operated by an air signal from said main housing.

3. A spray gun for mounting on a robot, said spray gun comprising:
   a main housing comprising a fluid passage and a compressed air passage;
   a spray head pivotably mounted to said main housing, said spray head being pivotable between at least first and second positions, said spray head comprising:
      a shaft comprising first and second ends;
      a compressed air passage in said first end;
      a fluid passage in said second end; and
      a nozzle assembly attached to said shaft intermediate said ends, said shaft ends rotatably pivoting in said main housing;
   means for transferring fluid from said housing to said spray head through said shaft second end and comprising means sealing said main housing fluid passage and said spray head fluid passage in sliding communication with one another and in isolation from the atmosphere;
   means transferring compressed air from said housing to said spray head through said shaft first end and comprising means sealing said main housing air passage and said spray head air passage in sliding communication with one another and in isolation from the atmosphere;
   means for rotatably positioning said spray head relative to said main housing, said positioning means comprising:
      a shaft gear mounted on said shaft;
      a sector gear rotatably mounted to said main housing and engaging said shaft gear;
      a main piston energizable between first and second directions, said piston being operatively connected to said sector gear so that when said main piston is energized in said first direction, said spray head is rotated to said first position and when said main piston is energized in said second direction, said spray head is rotated to said second position; and
      a stop piston which when energized contacts said sector gear when said main piston is energized in said first direction and limits the travel of said spray head to a third position intermediate said first and second positions said stop piston being free of connection with said sector gear when de-energized.

4. A spray gun for mounting on a robot arm, said spray gun comprising:

main housing comprising a fluid passage, a compressed air passage and means for generating an electrostatic potential of a level suitable for fluid coating, said generating means being contained entirely in said main housing;

a spray head pivotably mounted to said main housing, said spray head being pivotable between at least first and second positions, said spray head comprising:

a shaft comprising first and second ends;
a compressed air passage in said first end;
a fluid passage in said second end; and
a nozzle assembly attached to said shaft intermediate said ends, said shaft ends rotatably pivoting in said main housing;

means for transferring fluid from said housing to said spray head through said shaft second end and comprising means sealing said main housing fluid passage and said spray head fluid passage in sliding communication with one another and in isolation from the atmosphere;

means for transferring compressed air from said housing to said spray head through said shaft first end and comprising means sealing said main housing air passage and said spray head air passage in sliding communication with one another and in isolation from the atmosphere; and means for transferring the potential generated by said generating means to said spray head through said first end.

5. The spray gun of claim 4 wherein said generating means operates using the energy from compressed air supply to said gun, there being no external electrical energy supplied to said gun.

* * * * *